(12) United States Patent
Breugelmans et al.

(10) Patent No.: US 6,644,016 B2
(45) Date of Patent: Nov. 11, 2003

(54) PROCESS AND DEVICE FOR COLLECTING AIR, AND ENGINE ASSOCIATED THEREWITH

(75) Inventors: Frans Breugelmans, Diest (BE); Patrick Hendrick, Brussels (BE); Benoît Marquet, Nil-Saint-Vincent (BE); Marc Strengnart, Crisnee (BE)

(73) Assignee: Techspace Aero S.A. (BE)

( * ) Notice: Subject to any disclaimer, the term of this patent is extended or adjusted under 35 U.S.C. 154(b) by 0 days.

(21) Appl. No.: 09/904,493

(22) Filed: Jul. 13, 2001

(65) Prior Publication Data

US 2002/0066267 A1 Jun. 6, 2002

(30) Foreign Application Priority Data

Jul. 14, 2000 (EP) .............................. 00870164

(51) Int. Cl.$^7$ ................................ F02K 9/42
(52) U.S. Cl. ........................................ 60/208; 60/257
(58) Field of Search ........................ 60/208, 246, 257

(56) References Cited

U.S. PATENT DOCUMENTS

| 3,002,340 A | | 10/1961 | Landerman |
| 3,237,400 A | | 3/1966 | Kuhrt |
| 3,237,401 A | * | 3/1966 | Peters et al. ................. 60/246 |
| 3,452,541 A | | 7/1969 | Builder |
| 3,721,093 A | * | 3/1973 | Wolf ............................ 60/267 |
| 3,747,339 A | | 7/1973 | Wolf et al. |
| 3,756,023 A | | 9/1973 | Berman |
| 5,014,508 A | * | 5/1991 | Lifka ........................... 60/224 |
| 5,052,176 A | * | 10/1991 | Labatut et al. ............... 60/225 |
| 5,101,622 A | * | 4/1992 | Bond ........................... 60/246 |
| 5,154,051 A | | 10/1992 | Mouritzen |
| 5,167,117 A | | 12/1992 | Herzog et al. |

FOREIGN PATENT DOCUMENTS

DE 4402941 A 8/1994

OTHER PUBLICATIONS

English translation of European Search Report from Priority Application No. EP 00870164.1 dated Dec. 15, 2000.
Translated claims of DE 4402941 A1.

* cited by examiner

*Primary Examiner*—Ehud Gartenberg
(74) *Attorney, Agent, or Firm*—Knobbe, Martens, Olson & Bear, LLP

(57) ABSTRACT

A process for collecting oxygen-enriched air during a phase of aerobic flight of a space launch for combustion inside at least one cryotechnic rocket engine is provided. The launch rocket comprises at least one turbofan. The turbofan comprises a high-pressure spool comprising a high pressure compressor, a combustion chamber, turbines, and a low-pressure spool surrounding the high-pressure spool. The spools comprise a blower for collecting the external fluid in the form of a main flow and a derived flow. The main flow follows compression, combustion and depressurization in the turbofan engine. The derived flow is separated into oxygen-enriched air and oxygen-depleted air. The oxygen-enriched air is stored for combustion in a rocket engine, while the oxygen-depleted air is ejected.

22 Claims, 10 Drawing Sheets

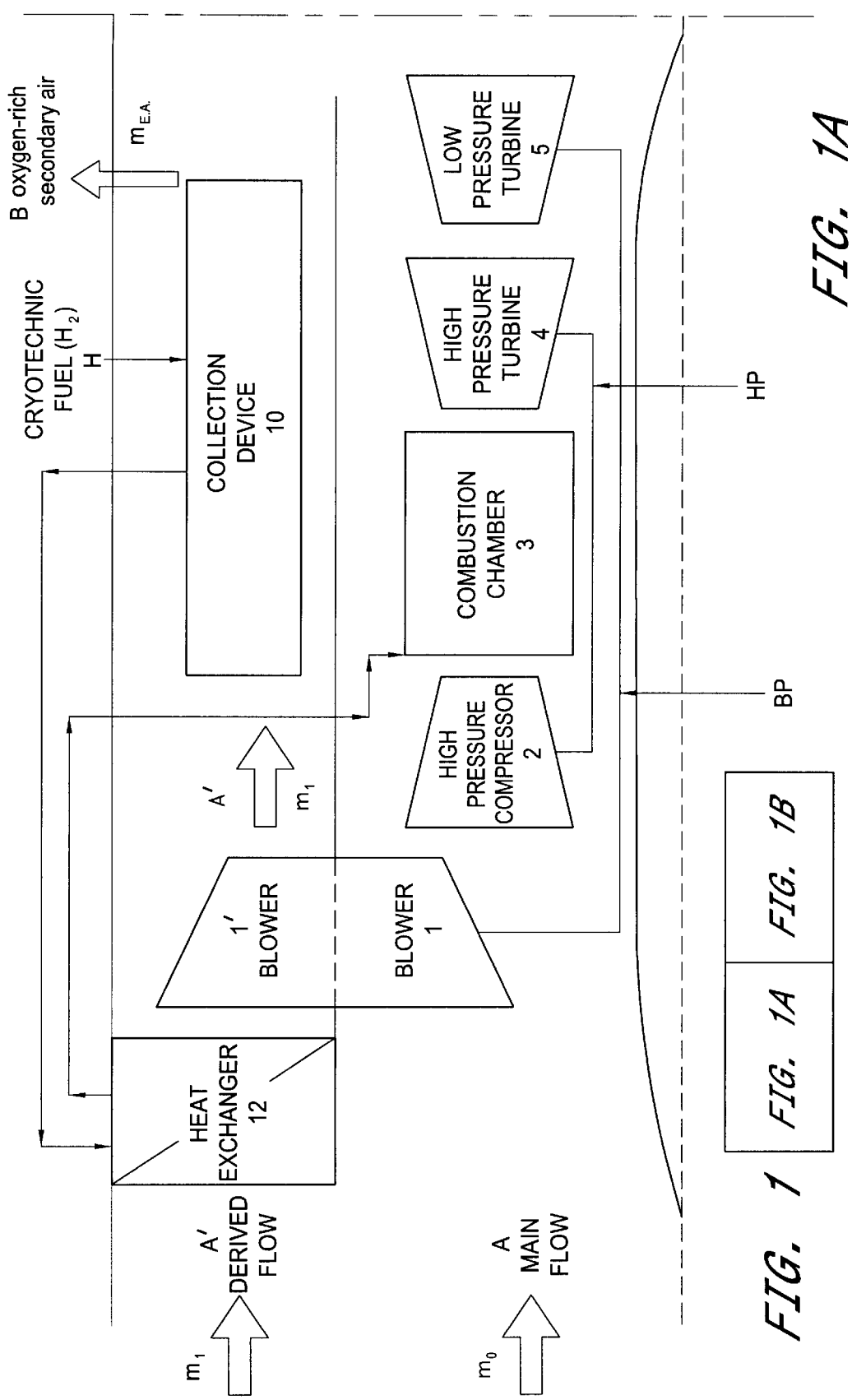

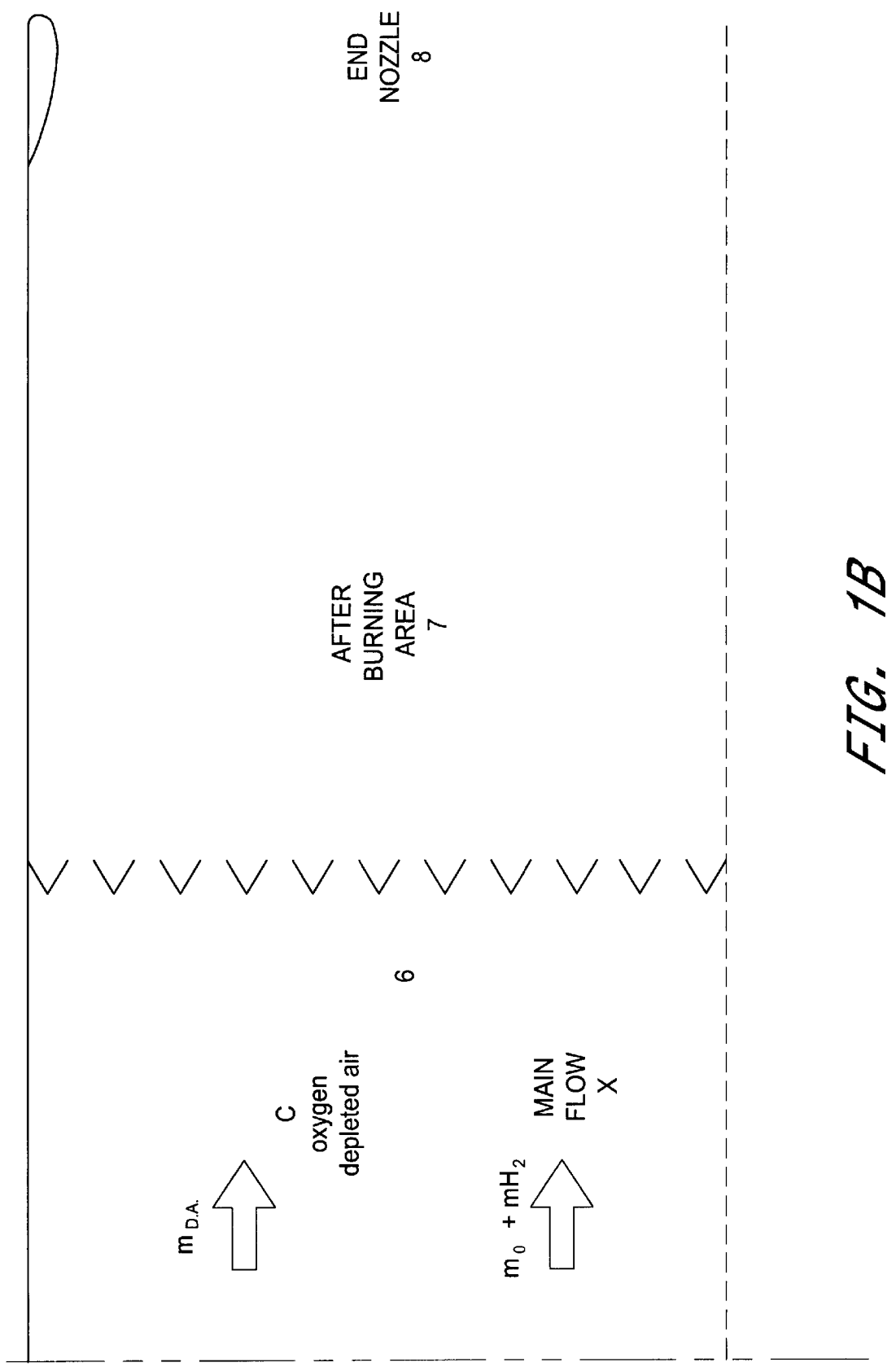

PROCESS AND DEVICE FOR COLLECTING AIR, AND ENGINE ASSOCIATED THEREWITH

CROSS-REFERENCE TO RELATED APPLICATIONS

This application claims priority to European Application Serial Number 00870164.1 filed on Jul. 14, 2000, the disclosure of which is incorporated herein by reference in its entirety.

FIELD OF THE INVENTION

The present invention relates to a process and a device for collecting oxygen-enriched air, which are intended to be used by a cryotechnic rocket engine for propelling a space launch rocket.

The present invention also relates to turbofan or turbocompressor type engines equipped with a collecting device.

DESCRIPTION OF THE RELATED ART

Certain space launch rockets are equipped with hydrogen/oxygen cryotechnic rocket engines which are conventional engines known to those skilled in the art.

It is observed that, for a launch rocket equipped with such an engine, the mass of oxygen on take-off is considerable and may be between 15% and 75% of the total mass of the launch rocket.

The present invention thus comprises launching such launch rockets with empty or at least partially empty oxygen tanks and in filling them with air or more particularly with oxygen-enriched air which will be collected in the atmosphere during an aerobic flight sequence. The oxygen-enriched air is stored on-board during this phase. It is used by the cryotechnic rocket engine beyond the atmosphere.

To achieve this, collection systems have already been studied since the 1950s, and more particularly in the United States, where prototypes of subsystems at least have been produced.

In particular, document U.S. Pat. No. 3,756,024 describes this principle of in-flight collection with intake of air: cooling—liquefaction—nitrogen/oxygen separation—storage of the liquid oxygen or oxygen-enriched air—evacuation of the nitrogen or oxygen-depleted air.

Such collection devices or systems are composed substantially of an air intake, a compressor for compressing the air, exchangers and a separator. Several types of separators have been studied: rotary separators, vortex tube separators, paramagnetic separators, etc. The aim of the exchangers is to cool and condense the entering air, by means of the cooling capacity of a cryogenic fluid which may be hydrogen present on-board the launch rocket. The organization of the exchangers varies depending on the devices envisaged. The exchangers allow heat to be exchanged between the air and the hydrogen either directly or via another fluid flow such as helium or nitrogen. These exchangers may also allow the depleted air to be heated before it is ejected.

The aim of the separator is to separate the air entering into a flow of oxygen-enriched air and a flow of oxygen-depleted air, the flow of oxygen-enriched air being stored while the flow of oxygen-depleted air is expelled outside.

These are essentially systems that are independent of the propulsion even though they occasionally participate in the propulsion by appropriate ejection of the depleted air. They also have the following drawbacks: creation of a drag proportional to the output of processed air; need for an external or system-generated power supply; and, need for an air intake, a compressor and a propelling nozzle.

A collection system may be characterized by the collection rate, which is the amount of enriched air produced per kilo of hydrogen consumed, by the separation efficiency, which is the proportion of oxygen entering the collection system and which is collected, and by the oxygen concentration in the collected air.

To carry out the collection as presented above, it is necessary for a part of the flight to be propelled by an aerobic engine, that is to say an engine which uses atmospheric oxygen as an oxidant. It is proposed to use a turbofan engine on take-off and during the first stage of the flight up to a maximum of Mach 4. At Mach 4 or at a lower speed, a transition to propulsion by an engine of ramjet type may take place. In all cases, a final transition to propulsion by a rocket engine must take place, beyond the atmosphere, to achieve a speed sufficient for satellization.

The space launch rocket may be a single-stage rocket but is preferably a two-stage rocket, only the second stage coming into operation preferably at the time of the transition to rocket engine propulsion so as not to have to accelerate the aerobic engine(s) which are heavy.

U.S. Pat. No. 5,154,051 describes a liquefied air system with (crude) separation of the constituents of the air for several possible applications, the advantage of which is to be able to make the position of the air intake independent of the nozzle, allowing separation of the constituents of water. Separation of water prevents it from icing up in the system and the separation of $O_2$-enriched air to allow storage for the purpose of collection or to be able to adjust the mix ratios in the combustion chamber during flight.

U.S. Pat. No. 3,002,340 describes a cycle of liquefied-air propulsion by integrating a liquefied-air system into a turbofan. However, no mention is ever made therein of collection strictly speaking comprising a cycle in which the air is compressed, cooled, liquefied, compressed again, heated and used in the gas generator.

SUMMARY OF THE INVENTION

The present invention aims to propose a process and a device for collecting oxygen-enriched air during the first phase of flight of a space launch rocket, which will be used as an oxidant for the rocket engine of this space launch rocket, this process and device not having the drawbacks of the prior art.

In addition, the present invention aims to provide a solution which is more effective, which consumes less energy, is of smaller volume or weight ratio, and which is less expensive than the solutions of the prior art.

In addition, the present invention aims to provide a solution which allows the thermodynamic and physical integration of a collection cycle with a turbofan engine used for the propulsion whereas, outside the collection phases, that is to say the phases of take-off and of low altitude, the turbofan engine is used conventionally.

The present invention aims to propose to directly integrate the collection device into the secondary flow of twin-flow propulsion engines, turbofan engines or turbojet engines used to propel space launch rockets during the first phase of the flight.

More particularly, the present invention aims to propose a process for collecting oxygen-enriched air during a phase of aerobic flight of a space launch rocket and which is intended to be used for combustion inside at least one cryotechnic rocket engine beyond the atmosphere. The launch rocket preferably comprises at least one engine of turbofan type. The turbofan engine is preferably a twin-spool and twin-flow engine and comprises a high-pressure spool consisting substantially of a high-pressure compressor, a combustion chamber in which the combustion of a cryotechnic fluid such as hydrogen takes place, turbines, and a low-pressure spool surrounding the high-pressure spool, consisting substantially of a blower for collecting the external fluid in the form of a main flow and a derived flow and a low-pressure turbine optionally followed by the after-burning area and a variable-geometry nozzle. The main flow is intended to follow the usual path of the various compression, combustion and depressurization cycles envisaged in the turbofan engine. The derived flow is subjected, after compression and cooling, to a separation in a separator for generating a flow of oxygen-enriched air and a flow of oxygen-depleted air. The flow of oxygen-enriched air is stored in order to be used for combustion inside a rocket engine, while the flow of oxygen-depleted air is ejected, preferably by being mixed with the main flow at the outlet of the low-pressure turbine.

Advantageously, the separation of the main flow and of the derived flow is carried out upstream of the fan and in the fan.

Preferably, the mixed flow passes into the after-burning area in which a flow of cryotechnic fluid is combusted before being ejected via the variable-geometry nozzle.

Advantageously, the derived flow undergoes a series of cooling/compression cycles carried out inside several exchangers and a cooling unit/condenser assembly.

According to one embodiment, before being collected by the blower, the derived flow undergoes cooling inside a heat exchanger.

According to an alternative embodiment, the cryotechnic fluid, and in particular hydrogen, is used to carry out the heat exchanges inside the exchangers with the flow of derived air.

According to an alternative embodiment, the flow of depleted air is used to carry out the heat exchanges inside the exchangers with the flow of derived air.

The present invention aims also to propose a device for collecting oxygen-enriched air during a phase of aerobic flight of a space launch rocket and which is intended to be used for combustion inside at least one cryotechnic rocket engine beyond the atmosphere. The launch rocket comprises at least one engine of a turbofan type. The turbofan engine is preferably a twin-spool and twin-flow engine. The engine comprises a high-pressure spool consisting substantially of a high-pressure compressor, a combustion chamber and turbines. The engine also comprises a low-pressure spool surrounding the high-pressure spool, consisting substantially of a blower for collecting the external fluid and in particular air, and a low-pressure turbine, optionally followed by an after-burning area and a variable-geometry nozzle. The engine comprises an exchanger, and a separator with which is combined a cooling unit/condenser assembly. The exchanger, separator and the cooling unit/condenser assembly are arranged directly downstream of the blower in order to use the air coming out from the blower in the form of a derived flow. The blower collects the derived flow and separates it into a flow of oxygen-enriched air and a flow of oxygen-depleted air.

Advantageously, a second exchanger is placed upstream of the blower.

Preferably, the blower of the turbofan engine has a physical separation so as to separate the main flow from the derived flow.

An alternative aspect of the present invention aims to propose a twin-spool and twin-flow engine of turbofan or turbocompressor type. The engine comprises a high-pressure spool consisting substantially of a high-pressure compressor, a combustion chamber and turbines, and a low-pressure spool surrounding the high-pressure spool, consisting substantially of a blower for collecting the external fluid and in particular air, and a low-pressure turbine. The low-pressure turbine may be optionally followed by an after-burning area and a variable-geometry nozzle. The blower may comprise two or three low-pressure stages and may comprise fins installed on its vanes and separations installed on its rectifiers so as to separate the derived flow from the main flow.

BRIEF DESCRIPTION OF THE DRAWINGS

FIG. 1 describes in a particularly schematic manner the principle used in a turbofan engine or a turbojet engine for collecting air according to the process of the invention.

DETAILED DESCRIPTION OF THE PREFERRED EMBODIMENT

Figure 2:
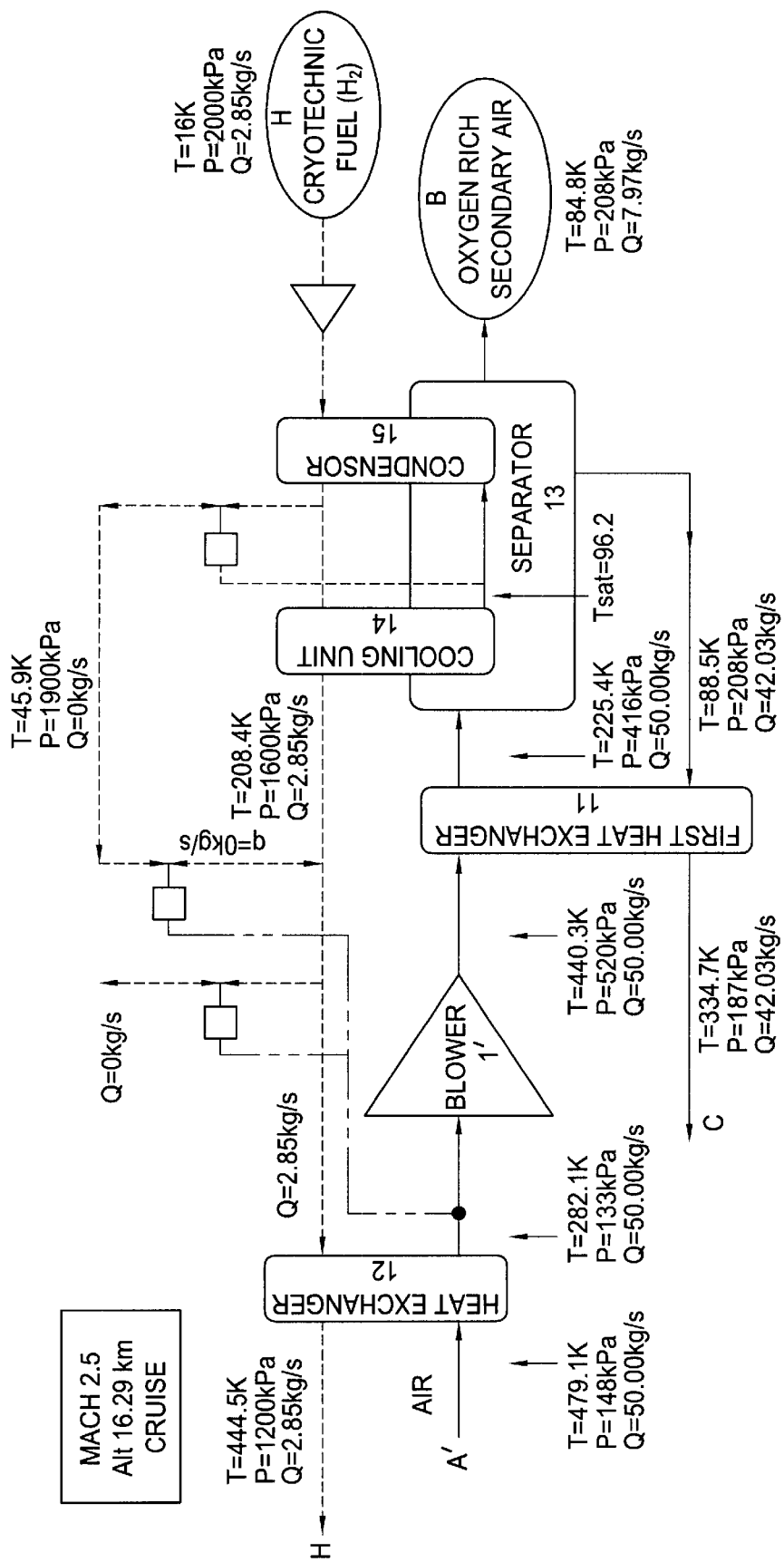
FIG. 2 represents the thermodynamic analysis of the various flows involved in the process according to the invention.
Figure 3A:
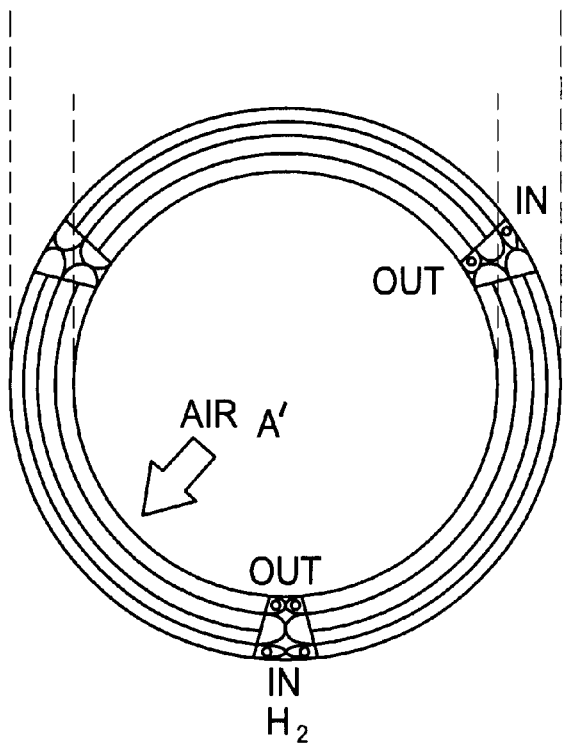
FIG. 3A is a front view representing an embodiment of an exchanger arranged upstream of the blower and used in the process and the device according to the present invention.
Figure 3B:
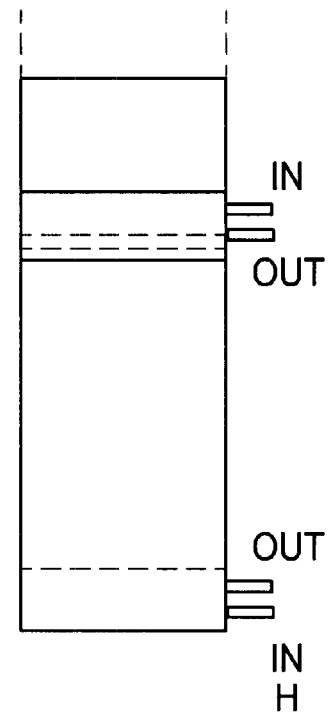
FIG. 3B is a side view representing an embodiment of an exchanger arranged upstream of the blower and used in the process and the device according to the present invention.
Figure 4A:
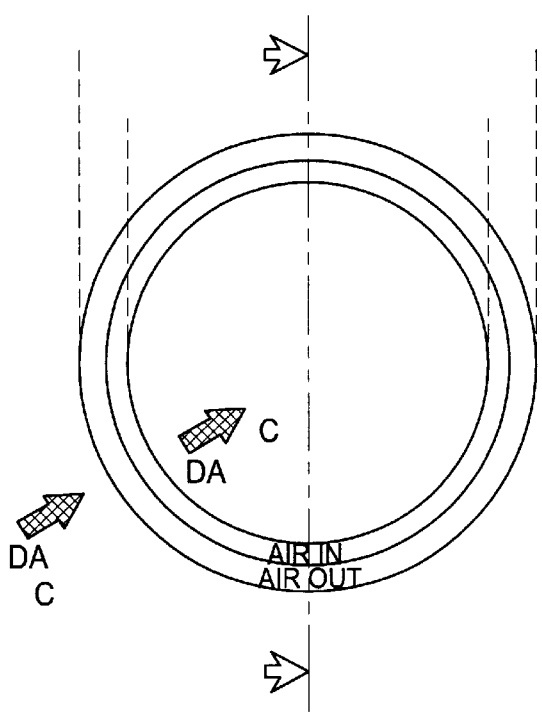
FIG. 4A is a front view representing an embodiment of an exchanger arranged at the separator outlet and used in the process and the device according to the present invention.
Figure 4B:
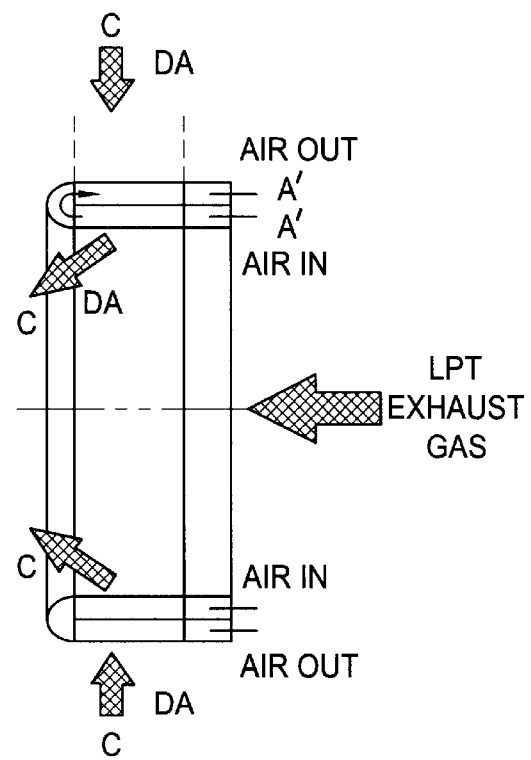
FIG. 4B is a side view representing an embodiment of an exchanger arranged at the separator outlet and used in the process and the device according to the present invention.
Figures 5A, 5B:
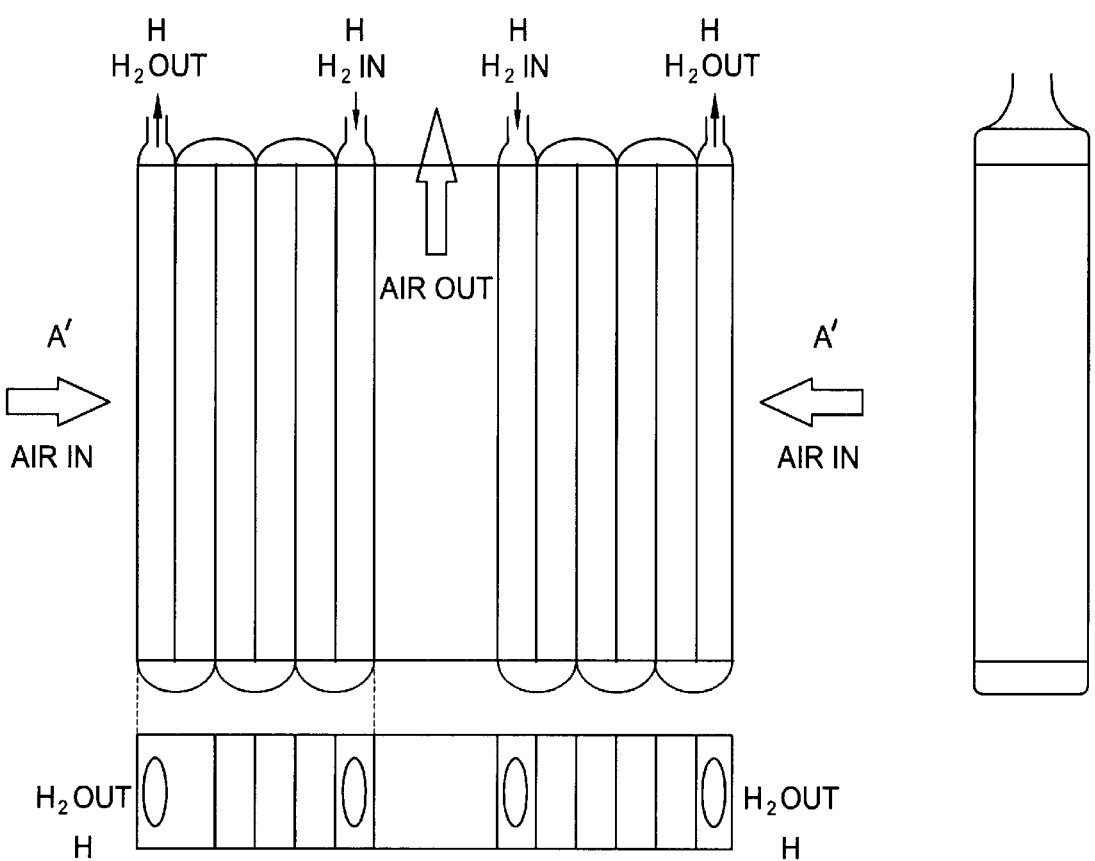
FIG. 5A is a front view representing an embodiment of a cooling unit used in the process and the device according to the present invention.
FIG. 5B is a side view representing an embodiment of a cooling unit used in the process and the device according to the present invention.

FIG. 1 represents in a particularly schematic manner a twin-spool and twin-flow turbofan engine with reheating (or after-burning) which may be used in the process of the invention, whereas FIG. 2 describes the path of the various flows involved in the process.

A conventional twin-spool turbofan engine comprises a high-pressure spool HP consisting of a high-pressure compressor 2 and high-pressure turbines 4, between which is arranged the combustion chamber 3. This high-pressure spool HP is surrounded by a low-pressure spool LP also consisting of a compressor and a turbine 5. The low-pressure compressor is preferably in the form of a blower 1, 1' allowing the external fluid to be collected and then directed towards the high-pressure spool HP where it undergoes combustion.

Both the low-pressure compressor 1 and the high-pressure compressor 2 comprise several compression stages which allow the pressure of the fluid to be raised gradually before it enters the combustion chamber.

According to one preferred embodiment, the high-pressure spool HP comprises about four successive compression stages. The blower 1, 1' may also comprise about four successive compression stages.

At the outlet of the combustion chamber 3, the burnt gases meet the vanes of the high-pressure turbines 4 and then low-pressure turbines 5, on which they lose a part of their energy, this part being used to drive the compressors. Next, the gases pass into the after-burning area 7 in which a second combustion may take place. Depressurization of the gases then takes place essentially in the variable-geometry end nozzle 8 allowing the propulsive thrust of the launch rocket.

In the case of a twin-flow engine, a part of the fluid (air) collected after a simple compression is conveyed directly into the variable-geometry end nozzle 8.

According to the present invention, a collection device 10 makes it possible to collect part of the flow which is referred to as the derived flow A' downstream the blower in its outer area 1', while the main flow A conventionally undergoes the various compressions and the combustion envisaged in a turbofan engine, giving a main flow X at the outlet of the low-pressure turbine 5.

As represented in FIG. 2, the collection device 10 substantially comprises a first heat exchanger 11 and a separator 13 with which are combined a cooling unit 14 and a condenser 15.

The heat capacity used by these various components consisting of the exchanger, cooling unit and condenser may be derived either directly from the fuel which may be hydrogen, but also methane or any other cryotechnic fuel, or from an intermediate fluid between the air and the fuel, such as helium or nitrogen, or from the depleted air obtained after separation.

According to the preferred embodiment of the invention represented in FIG. 2, a heat exchange is envisaged inside the first heat exchanger 11 with the depleted air C, while the heat exchange with the cooling unit/condenser assembly 14, 15 is carried out with the cryotechnic fuel H, which is hydrogen in the present case.

In addition, a heat exchanger 12 is also arranged upstream from blower 1' in order to cool the derived flow A'. The heat capacity of this exchanger preferably originates directly from the fuel H.

After passing into the exchanger 12, the derived flow A' passes into the outer area of the blower 1' before entering the collection system 10.

It is preferable for the two flows (main flow A and derived flow A') to be separated from the beginning, including in the blower. This blower is in the form of a four-stage low-pressure compressor. It may advantageously be made with "fins" installed on the vanes and separations installed on the rectifiers. Perfect leak-tightness is not necessary at this stage, but the (negative) influence on the performance qualities will be proportionately lower the greater the leak-tightness.

After it has passed into the collection device 10, a part of the derived flow A' is in the form of oxygen-enriched liquid secondary air B, having an oxygen concentration of about 90% to 99%, and which will be stored in a tank. The other fraction of the derived flow, that is to say the oxygen-depleted air C, optionally passes into the reheating area of the primary exchanger 11 before being mixed with the main flow X at the outlet of the low-pressure turbine 5. After mixing, the gases thus formed may further burn fuel in the after-burning area 7.

The path of the hydrogen H (or any other cryotechnic fuel) is as follows: it is pumped and conveyed into the separator 13 in which it is heated in the cooling unit/condenser assembly 14, 15 and then in the exchanger 12 before being conveyed to the combustion chamber 3.

Particularly preferred embodiments of exchanger 12, exchanger 11 and cooling unit 14 are represented, respectively, in FIGS. 3A–3B, 4A–4B and 5A–5B. The exchangers 11 and 12 are circular exchangers, in the form of drums, which "surround" the engine. The main flow passes through the exchangers perpendicular to their axis, while the secondary flows circulate in tubes.

Advantageously, the solution, which the present invention uses, allows the pooling of components required for the propulsion system and for the collection system (air intake, compressor, power generation by the turbine, propulsion nozzles). This device also makes it possible to reduce the drag caused by the collection system, by means of a more efficient ejection of the oxygen-depleted air. Furthermore, outside the collection sequence, the portion of the compressor dedicated to collection is directly involved in propulsion.

FIG. 2 also shows the thermodynamic analysis of an embodiment described schematically in FIG. 1. The example used is that of a horizontal take-off two-stage launch rocket. It is propelled up to a speed of about Mach 3.8 by several (for example, eight) turbofan engines having the collection system described in FIG. 1.

A cruise flight is envisaged at a speed of about Mach 2.5 so that the collection of enough enriched air for the rocket-engine propulsion phase is achieved.

Preferably, this collection is envisaged during the acceleration of the launch rocket between about Mach 1.8 and Mach 3.

Figure 6:
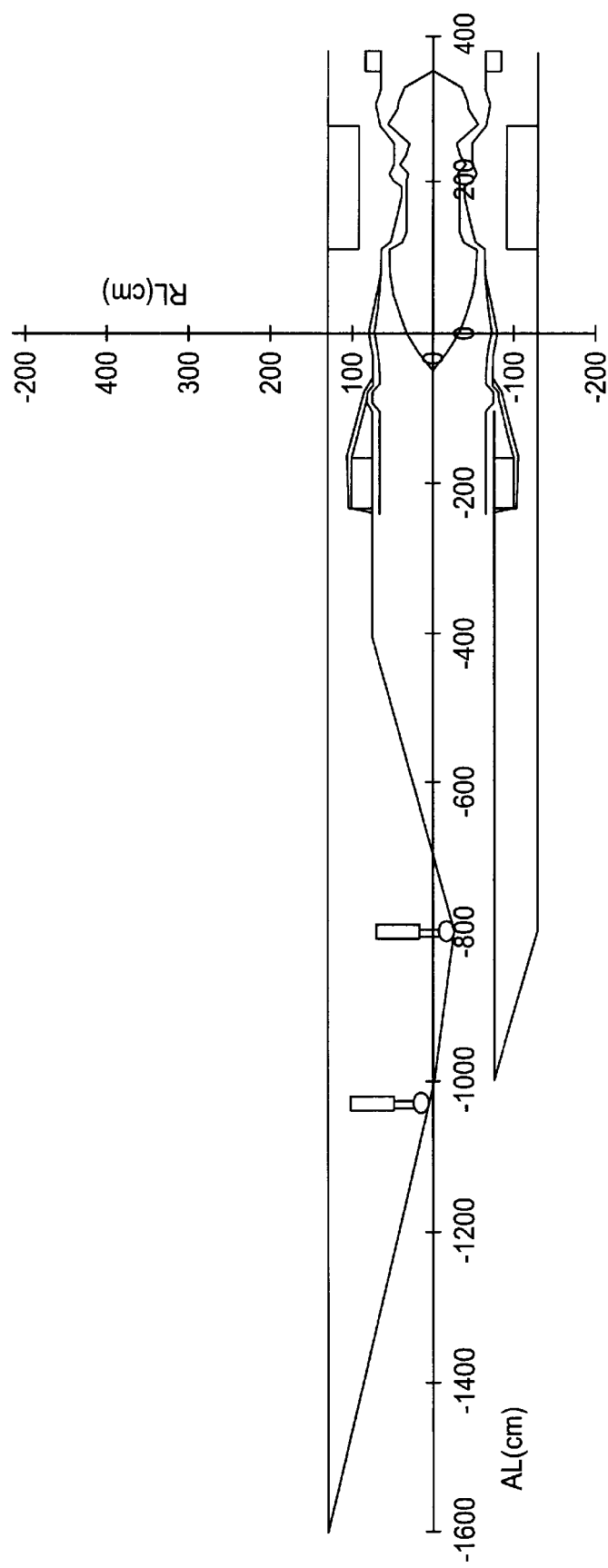
FIG. 6 represents a cross-section view of the integration of the engine, the collection system and the air intake, which also gives the axial dimensions (AL) on the x-axis and the radial dimensions (RL) on the y-axis.

FIG. 6 represents the integration of the engine, the collection system and the air intake. This is a variable 2D air intake in order to have a sufficient efficiency for take-off at supersonic speeds.

Figure 7:
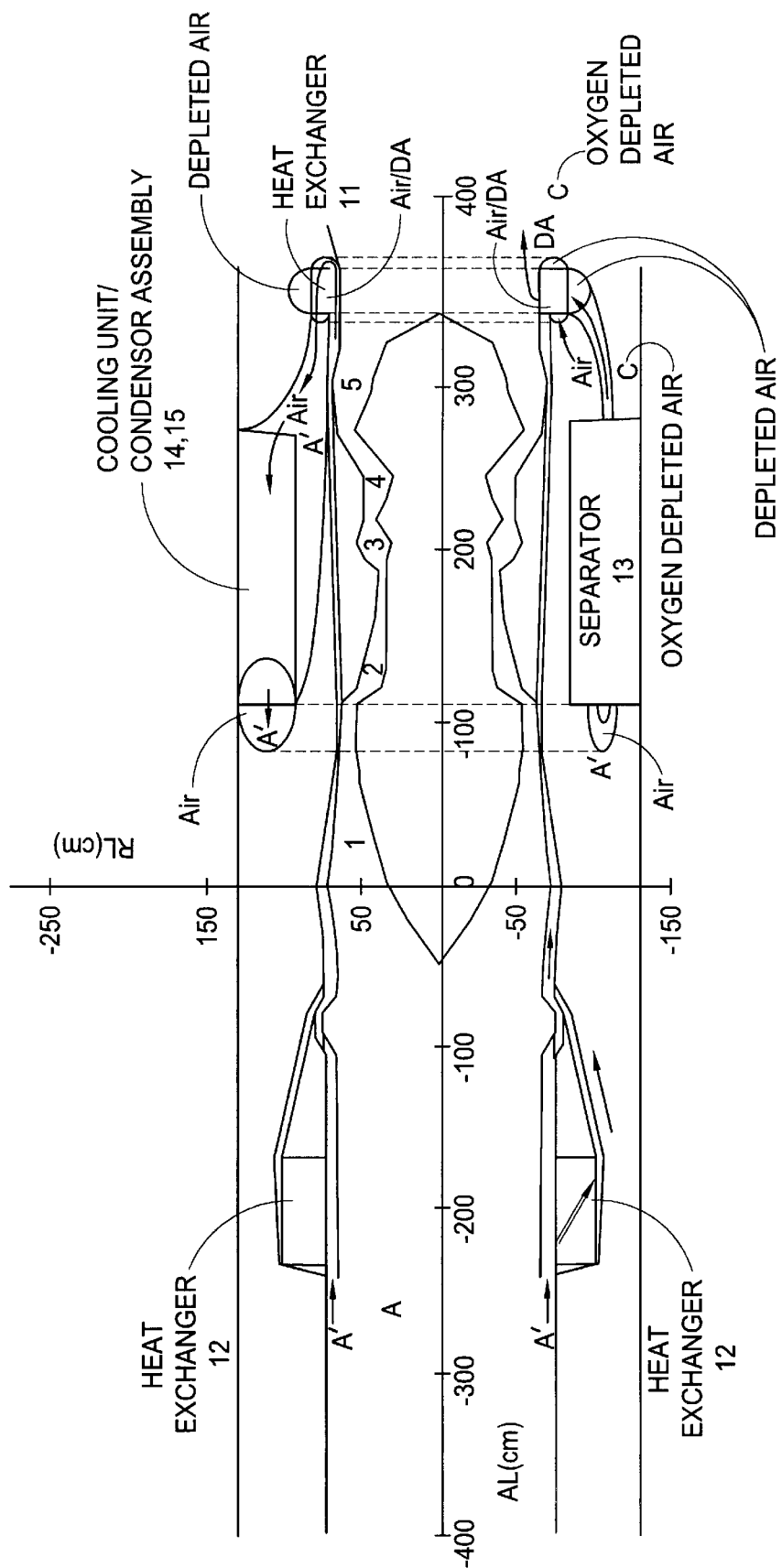
FIG. 7 is a detailed view of FIG. 6, which represents more particularly the integration of the engine and the collection system.

FIG. 7 shows the details of the integration of the engine and the collection system. The air entering via the air intake is separated into two flows A and A'. The main flow A follows the conventional path of air in a turbojet engine. As represented in this figure, the secondary flow A' is separated from the main flow A upstream of the turbofan (blower) and in the turbofan (blower).

The secondary flow A' may take two different paths depending on whether collection takes place (during cruising and/or at moderate speed) or not (take-off, low speed and high speed).

Figure 8:
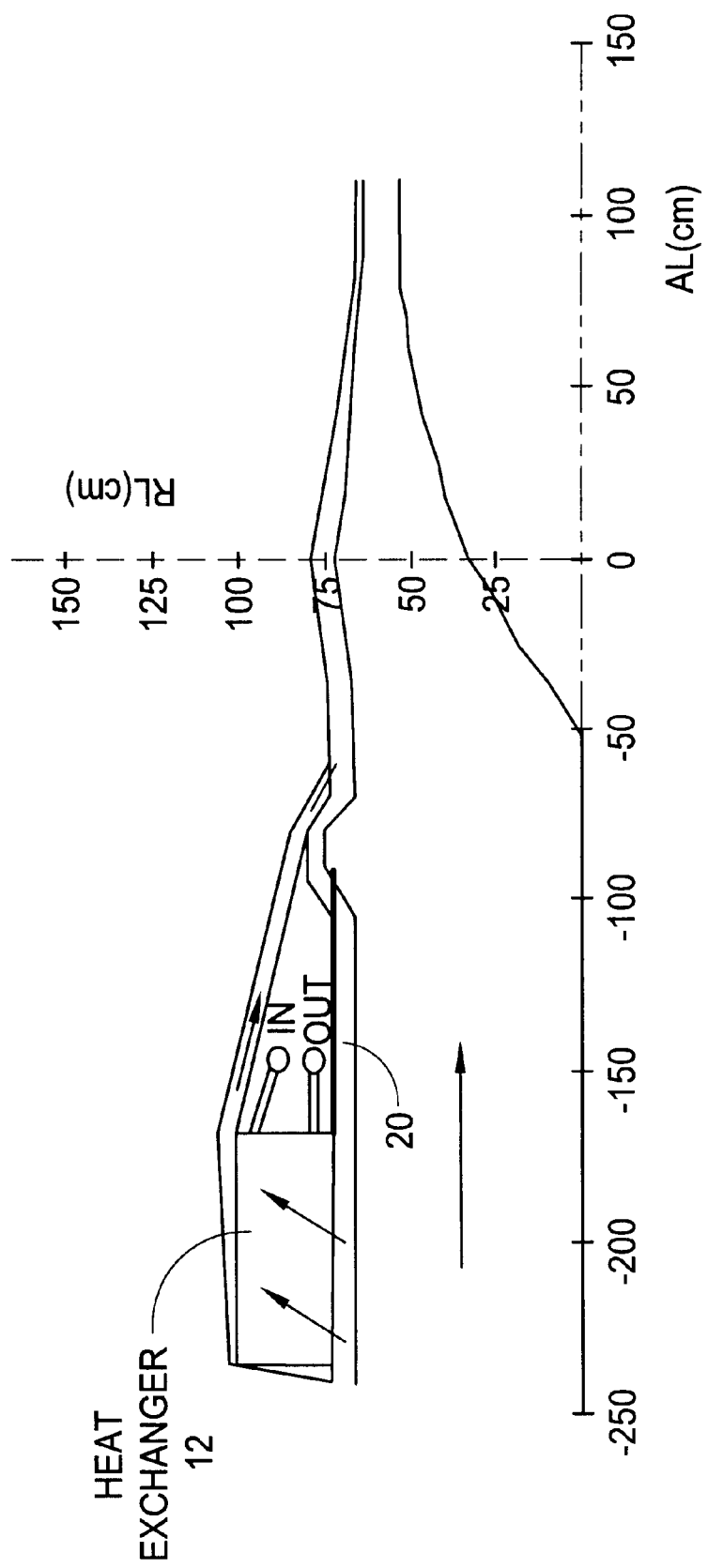
FIG. 8 represents the path of the air during collection for one particular embodiment example of the process according to the present invention.
Figure 9:
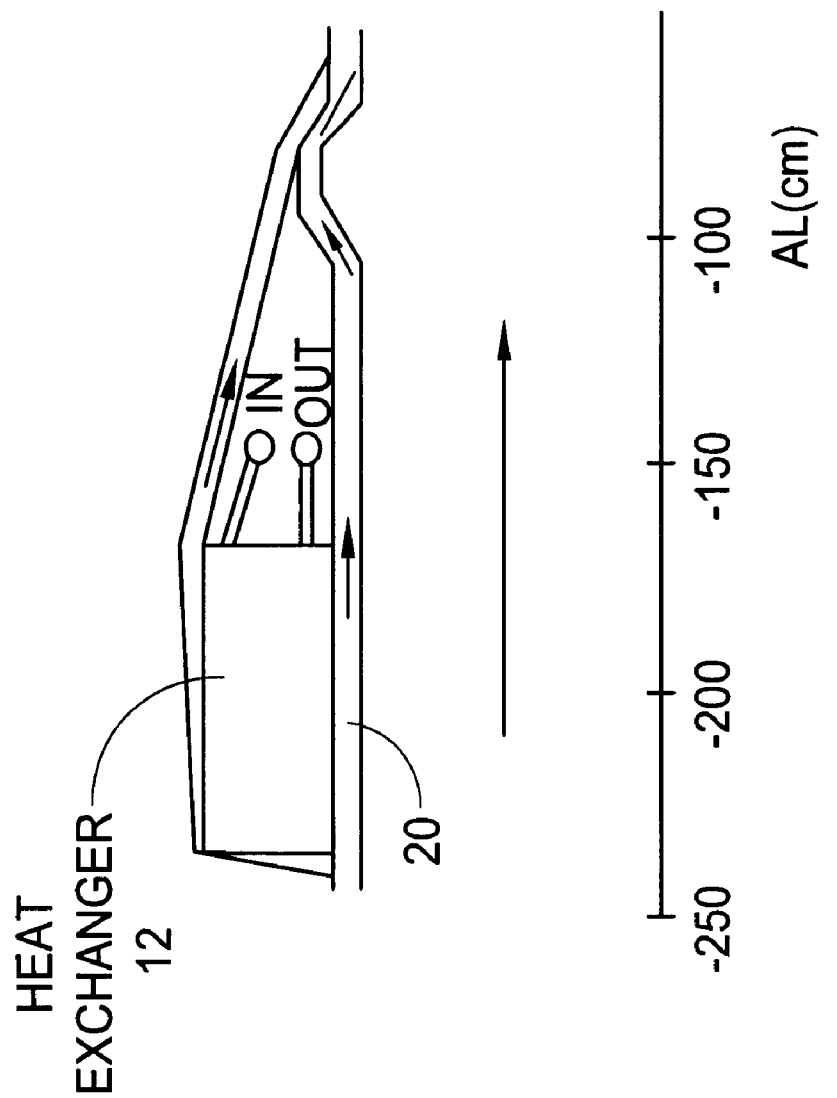
FIG. 9 represents the path of the air outside collection for one particular embodiment example of the process according to the present invention.

One particular embodiment example is represented in FIGS. 8 and 9, in which it is observed that the passage of the secondary flow A' via one path or another is determined by the position of the cylindrical plate 20. Outside the periods when collection is carried out (FIG. 9), the secondary flow A' also follows the conventional course of the secondary flow of a turbofan engine. During collection (FIG. 8), the secondary flow A' is derived into the exchanger 12 in which it is cooled by a cryotechnic fluid before passing into the outer part of the fan 1'. The secondary flow A' then passes along the engine and is cooled in an exchanger 11 whose coolant fluid is oxygen-depleted air leaving the separator. The exchangers 11 and 12 (see FIGS. 4A–4B and 3A–3B, respectively) are circular, in the form of drums, and surround the engine. The main flows pass through the exchangers perpendicularly to their axis, while the secondary flows circulate in tubes. After the exchanger 11, the air A; passes into the exchangers 14 and 15 where it is cooled and partially condensed. The air A' is then conveyed into the separator 13. An oxygen-enriched flow B leaves the separator and is stored on-board the launch rocket, and an oxygen-depleted flow C leaves the separator and is conveyed into the exchanger 11 to cool the air A'. Next, the flow C is mixed with the main flow X leaving the low-pressure turbine 5. The mixture then undergoes after-burning and is ejected via the variable-geometry nozzle 8 to provide thrust.

What is claimed is:

1. A method of collecting oxygen-enriched air for use in combustion in a rocket engine, comprising:
    separating a derived flow of air from a main flow of air through an engine during aerobic flight;
    separating oxygen-enriched air in said derived flow from oxygen-depleted air in said derived flow;
    storing said oxygen-enriched air for combustion by said rocket engine;
    mixing the oxygen-depleted air with said main flow; and
    ejecting said mixture of oxygen-depleted air and said main flow from said engine.

2. The method of claim 1, wherein said engine comprises a turbofan engine.

3. The method of claim 2, wherein said separation occurs upstream of the turbofan and in the turbofan of said turbofan engine.

4. The method of claim 2, wherein said turbofan engine comprises:
    a high pressure spool comprising a high-pressure compressor, turbines and a combustion chamber, between said compressor and said turbines; and
    a low pressure spool surrounding said high pressure spool, said low pressure spool comprising a blower for collecting said main flow and said derived flow, and a low pressure turbine.

5. The method of claim 4, wherein said combustion chamber combusts a cryotechnic fluid.

6. The method of claim 5, wherein said cryotechnic fluid comprises hydrogen.

7. The method of claim 6, wherein said turbofan engine further comprises an after-burning area.

8. The method of claim 7, wherein said turbofan engine further comprises a variable-geometry nozzle.

9. The method of claim 2, wherein after separation the derived flow undergoes a cooling inside a heat exchanger before being collected by a blower.

10. The method of claim 8, wherein the flow of oxygen-depleted air passes into the after-burning area in which a flow of cryotechnic fluid is combusted before being ejected via the variable-geometry nozzle.

11. The method of claim 10, wherein the oxygen depleted air is mixed with the main flow at the outlet of the low-pressure turbine.

12. The method of claim 2, wherein said derived flow undergoes a series of coolings/compressions carried out inside several exchangers and a cooling unit/condenser assembly.

13. The method of claim 9, wherein a cryotechnic fluid is used to carry out the heat exchanges inside the exchanger with the derived flow of air.

14. The method of claim 13, wherein said cryotechnic fluid comprises hydrogen.

15. A method of collecting oxygen-enriched air for use in combustion in a rocket engine, comprising:
    separating a derived flow of air from a main flow of air through an engine during aerobic flight;
    separating oxygen-enriched air in said derived flow from oxygen-depleted air in said derived flow;
    storing said oxygen-enriched air for combustion by said rocket engine;
    mixing the oxygen-depleted air with said main flow; and
    ejecting said mixture of oxygen-depleted air and said main flow from said engine,
    wherein said engine comprises a turbofan engine and wherein said separation occurs upstream of the turbofan and in the turbofan of said turbofan engine.

16. A method of collecting oxygen-enriched air for use in combustion in a rocket engine, comprising:
    separating a derived flow of air from a main flow of air through an engine during aerobic flight;
    separating oxygen-enriched air in said derived flow from oxygen-depleted air in said derived flow;
    storing said oxygen-enriched air for combustion by said rocket engine;
    mixing the oxygen-depleted air with said main flow; and
    ejecting said mixture of oxygen-depleted air and said main flow from said engine,
    wherein said engine comprises a turbofan engine, and wherein said turbofan engine comprises:
        a high pressure spool comprising a high-pressure compressor, turbines and a combustion chamber, between said compressor and said turbines; and
        a low pressure spool surrounding said high pressure spool, said low pressure spool comprising a blower for collecting said main flow and said derived flow, and a low pressure turbine.

17. The method of claim 16, wherein said combustion chamber combusts a cryotechnic fluid.

18. The method of claim 17, wherein said cryotechnic fluid comprises hydrogen.

19. The method of claim 18, wherein said turbofan engine further comprises an after-burning area.

20. The method of claim 19, wherein said turbofan engine further comprises a variable-geometry nozzle.

21. The method of claim 20, wherein the flow of oxygen-depleted air passes into the after-burning area in which a flow of cryotechnic fluid is combusted before being ejected via the variable-geometry nozzle.

22. The method of claim 21, wherein the oxygen depleted air is mixed with the main flow at the outlet of the low-pressure turbine.

* * * * *